United States Patent
Hillyard et al.

(10) Patent No.: US 7,751,426 B2
(45) Date of Patent: Jul. 6, 2010

(54) TOKEN PASSING DATA TRANSFER MECHANISM FOR RESERVATION BASED PROTOCOLS

(75) Inventors: Jason Hillyard, San Diego, CA (US); James Laurence Taylor, Sherborne (GB)

(73) Assignee: Staccato Communications, Inc., San Diego, CA (US)

( * ) Notice: Subject to any disclaimer, the term of this patent is extended or adjusted under 35 U.S.C. 154(b) by 172 days.

(21) Appl. No.: 12/221,460

(22) Filed: Aug. 1, 2008

(65) Prior Publication Data
US 2009/0080456 A1    Mar. 26, 2009

Related U.S. Application Data

(60) Provisional application No. 60/963,236, filed on Aug. 3, 2007.

(51) Int. Cl.
*H04L 12/403*    (2006.01)
*H04B 7/212*    (2006.01)

(52) U.S. Cl. ...................... 370/450; 370/443

(58) Field of Classification Search ............ 370/443, 370/330, 450, 320, 348, 458–459
See application file for complete search history.

(56) References Cited

U.S. PATENT DOCUMENTS

| | | | |
|---|---|---|---|
| 7,366,155 B1 * | 4/2008 | Leppisaari et al. | 370/348 |
| 7,664,131 B2 * | 2/2010 | Chun et al. | 370/443 |
| 2004/0038684 A1 * | 2/2004 | Sugaya | 455/450 |
| 2005/0094657 A1 | 5/2005 | Sung et al. | |
| 2006/0198335 A1 * | 9/2006 | Reunamaki et al. | 370/328 |
| 2006/0198353 A1 * | 9/2006 | Wason et al. | 370/347 |
| 2007/0086425 A1 | 4/2007 | Leow et al. | |
| 2007/0153717 A1 | 7/2007 | Tervonen et al. | |
| 2007/0248072 A1 * | 10/2007 | Kwon et al. | 370/345 |
| 2008/0259895 A1 * | 10/2008 | Habetha et al. | 370/345 |

FOREIGN PATENT DOCUMENTS

WO    WO 2005/057830 A2    6/2005

\* cited by examiner

*Primary Examiner*—Steven H Nguyen
*Assistant Examiner*—Candal Elpenord
(74) *Attorney, Agent, or Firm*—Van Pelt, Yi & James LLP

(57) ABSTRACT

Token passing data transfer mechanism for reservation based protocols is provided. In some embodiments, a token passing data transfer mechanism for reservation based protocols includes sharing a reservation between a first device and a second device including transmitting a zone activity frame from the first device to the second device to modify the default allocation of the reservation blocks between the first device and the second device, in which the zone activity frame includes a first bit mask indicating which zone reservation blocks the first device requests for transmitting data to the second device during a plurality of zones of the superframe, in which a zone reservation block includes a plurality of contiguous reserved slots within a zone, and the second reservation includes a plurality of zones.

22 Claims, 11 Drawing Sheets

TOKEN PASSING DATA TRANSFER MECHANISM FOR RESERVATION BASED PROTOCOLS

CROSS REFERENCE TO OTHER APPLICATIONS

This application claims priority to U.S. Provisional Patent Application No. 60/963,236 entitled TOKEN PASSING DATA TRANSFER MECHANISM FOR RESERVATION BASED PROTOCOLS filed Aug. 3, 2007, which is incorporated herein by reference for all purposes.

BACKGROUND OF THE INVENTION

Existing communication protocols for network communication allow devices to transmit data to each other. Wireless network communication protocols, such as the well known Bluetooth wireless network protocol standard, allow devices to use radios to transmit data between devices via wireless network communication. Reservation protocols for network communication allow a device to obtain a reservation to transmit data to another device.

BRIEF DESCRIPTION OF THE DRAWINGS

Various embodiments of the invention are disclosed in the following detailed description and the accompanying drawings.

DETAILED DESCRIPTION

Figure 1:
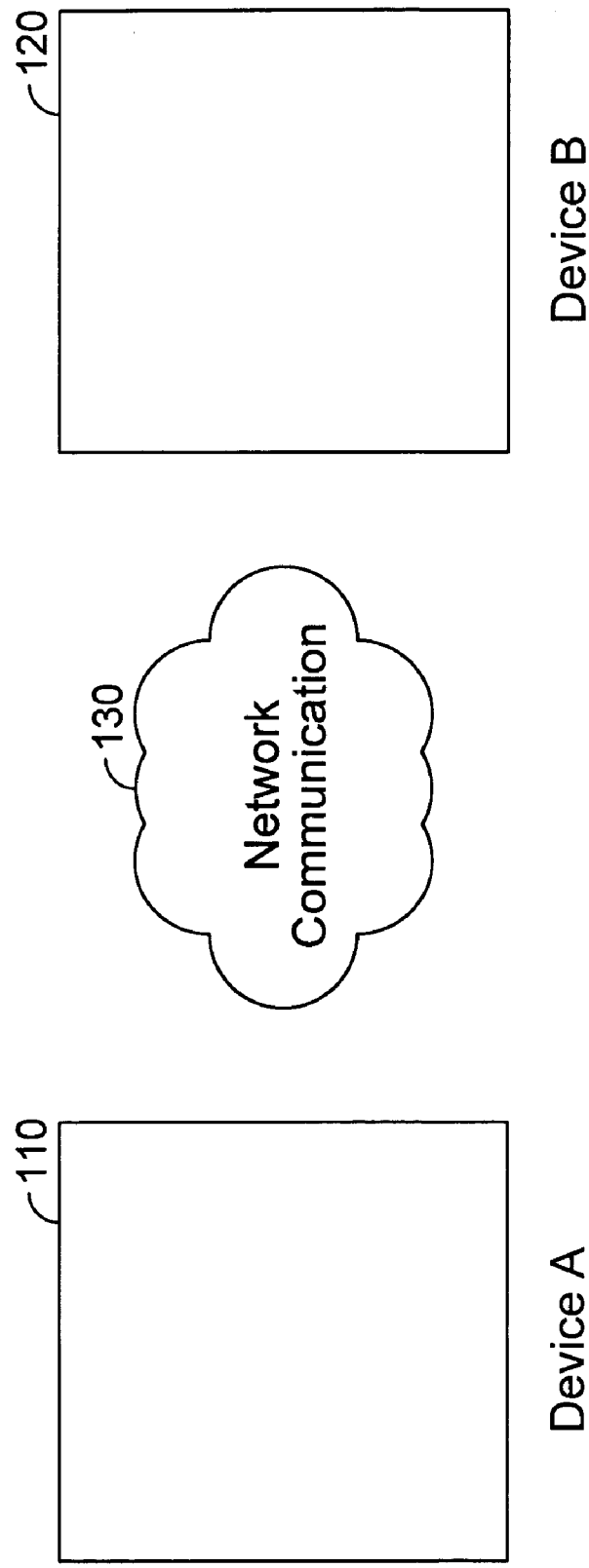
FIG. 1 is a block diagram illustrating devices for network communication using a token passing data transfer mechanism for reservation based protocols.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

What is needed is a system and process for a token passing data transfer mechanism to allow two devices to transfer data back and forth using a single reservation for a reservation based protocol via network communication (e.g., a wireless network). In one embodiment, a token passing data transfer mechanism provides a new private reservation protocol for reservation based wireless network protocols (e.g., a new Bluetooth Private Reservation Protocol). For example, the next generation of Bluetooth technology will use Ultra Wideband (UWB) radios and the WiMedia MAC (WiMedia technology is a published radio standard for high-speed ultra-wideband (UWB) wireless connectivity, see *Standard ECMA-368 High Rate Ultra Wideband PHY and MAC Standard*, 2$^{nd}$ Edition/December 2007, published by ECMA, Rue du Rhône 114, CH-1204 Geneva, Switzerland, available at http://www.ecma-international.org/publications/standards/Ecma-368.htm, which is incorporated by reference herein in its entirety, and which is also published as an ISO standard, Information technology—Telecommunications and information exchange between systems—High Rate Ultra Wideband PHY and MAC Standard—ISO/IEC 26907, available at http://www.iso.org/iso/iso_catalogue/catalogue_tc/catalogue_detail.htm?csnumber=43900, which is incorporated by reference herein in its entirety).

In one embodiment, a data transfer mechanism for sharing reservations is provided that meets the requirements of Bluetooth applications. For example, the WiMedia MAC allows devices to transfer data using a reservation protocol called the Distributed Reservation Protocol (DRP). A reservation defines allocated blocks of time during which data can be transferred from a device that acquired a reservation with another device. A reservation is controlled by the device that initiated the reservation. Devices that communicate using the WiMedia MAC are synchronized with each other and communicate in a periodic time interval called a superframe. A reservation allocates one or more contiguous blocks of time (e.g., reservation blocks) in a superframe. In one embodiment, a reservation block is one or more temporally contiguous Medium Access Slot(s) (MAS) within a reservation not adjacent to other MAS in the reservation.

The WiMedia MAC defines different types of reservations, including hard, soft, and private reservations. In hard and soft reservations only the owner of the reservation can transmit data frames in the reservation without contention. Thus, hard and soft reservations essentially allow one-way data transfer without contention. Because certain Bluetooth applications require two-way data transfer, two hard or soft reservations would be required for each connection between two devices for such applications. In a private reservation, the transmission access rules are application-specific. In one embodiment, a private reservation protocol is provided with transmission access rules that allows both devices to transfer data without contention using a single reservation and which meets the requirements for Bluetooth applications. Using a single reservation also makes more efficient use of network bandwidth and simplifies the opening and closing of connections between two devices.

In one embodiment, a private reservation with a token passing scheme is used to arbitrate data transmission access between two devices. In one embodiment, only the holder of the token is allowed to transmit data. When the holder of the token is finished transmitting data, it passes the token to the other device, which can then transmit data.

For example, one or more of the following features can be used (e.g., to improve efficiency and reliability):
  The token holder automatically alternates with each reservation block.
  The reservation owner always becomes the token holder at the start of each superframe.
  These two features have the following example benefits:
  Provides equal transmission bandwidth to both devices for an even number of reservation blocks.
  Fewer token passing transmissions are required.
  Allows for fast recovery when the token is lost.
  Allows for fast recovery if synchronization between devices is temporarily lost.
  It prevents transmission access contention (e.g., avoids a situation in which both devices believe they each have the token).
  The reservation can be modified without losing the token.

In one embodiment, the token can be transferred within a reservation block. This allows for an efficient use of reservation bandwidth and works well for asymmetric data transfer scenarios, such as file transfer, where one device transmits the majority of the time. In one embodiment, a token is transferred using a specially formatted data frame (e.g., a specially formatted WiMedia data frame). For example, the first octet of the data frame indicates the purpose of the frame (token or data). It can also indicate whether the token is passed or not. For example,
  0=token is not transferred to other device
  1=token is transferred to other device In one embodiment, at the start of each reservation block the holder of the token must transmit a frame, either a data frame or a token frame. If the receiving device does not receive any valid frames before a timeout, then the receiving device may (optionally) turn off its receiver (e.g., power down its radio). After passing the token, a device turns on its receiver and listens for frames from the other device. The other device is then expected to transmit a frame before a timeout. If the receiving device does not receive any valid frames before a timeout, the receiving device may (optionally) turn off its receiver. When both devices send token=1, then neither device has data to send, and the remainder of the reservation block will not be used, and both devices can (optionally) turn off their receivers for the remainder of the reservation block.

In one embodiment, acknowledgment policies are used, such as an acknowledgment policy of the token frame, which allows for more flexibility. For example, when the token is passed (token=1) it is efficient to send the frame with no acknowledgement required. When the token is not passed (token=0), the frame can set the acknowledgement policy to block-Ack to set up a block-Ack transfer. In one embodiment, a block acknowledgment is a single acknowledgement or transmission that acknowledges transmissions of multiple data frames. A device may also send a frame with token=0 with no acknowledgement required, which will ensure the receiving device keeps its receiver on to listen for subsequent transmissions during the current reservation block.

Certain applications, such as file transfer applications, may have asymmetric data transmission patterns, that is, with one device transmitting most of the time. When the disclosed token passing data transfer mechanism is used by such an asymmetric application, the device that is not sending data typically passes its token at the beginning of its allocated reservation blocks. If the device knows in advance that it does not have data to send, or will probably not have much data to send, then it is possible to use that information for further reservation based protocol optimizations. For example, when a device knows in advance which reservation blocks the other device intends to use during a superframe, the device can listen in those reservation blocks for data, implicitly passing the token. If neither device requests using a reservation block, both devices can turn off their receivers (e.g., power down their radios) without exchanging tokens. One example optimization is for both devices to request the reservation blocks that they desire to use at the beginning of the superframe (e.g., using a bit mask). In one embodiment, this information is transmitted in a beacon frame, or alternatively, in a token frame.

Another example optimization is for both devices to announce the zone reservation blocks they desire to use at the beginning of the superframe (e.g., using a zone activity frame and a zone activity response frame). In one embodiment, a zone reservation block within a reservation is a set of contiguous reserved MAS within a zone, in which there can be multiple zone reservation blocks in a zone. If a set of contiguous reserved MAS cross a zone boundary, the MAS in each zone are part of different zone reservation blocks (i.e., zone reservation blocks, unlike reservation blocks, cannot span zone boundaries). These and other optimizations allow the devices to efficiently negotiate additional bandwidth in the superframe dynamically, and also allow for enhanced power savings, for example, when both devices have no data to send and relinquish all reserved bandwidth.

In one embodiment, the information indicating the requested reservation blocks is contained in a 16-bit integer with each bit representing a zone in the superframe: Bit 0 represents zone 0, bit 1 represents zone 1, etc. Consider the following example of a superframe with reservation blocks in eight zones. Device A is the reservation owner. By default, Device A and Device B have the following bit masks:
  Default Device A: 01010101
  Default Device B: 10101010

For example, suppose Device A has a lot of data to send so it wants all the reservation blocks. Device B has no data to send but still desires one reservation block in case it has new data to send during the superframe:

Desired Device A: 11111111
Desired Device B: 10000000
The resulting reservation block usage would be:
Result Device A: 01111111
Result Device B: 10000000

Device A can then transmit data in zones 0-6, and Device B can transmit data in zone 7. In one embodiment, Device A can request to use Device B's zones, but Device B is not required to relinquish them. Those of ordinary skill in the art will recognize that this mechanism can be applied to any number of zones in a superframe (e.g., in which zones can be requested and represented using 32-bit integers, 64-bit integers, etc. according to the number of zones in the superframe).

For another example, suppose Device A only wants one zone, and Device B wants to use its default zones:

Desired Device A: 00000001
Desired Device B: 10101010

The resulting zone usage is the same as the desired zones. However, note that certain zones are not used. Both devices can then turn off their receivers during these unallocated/unused zones.

FIG. 1 is a block diagram illustrating devices for network communication using a token passing data transfer mechanism for reservation based protocols. In the example shown, device A 110 is in network communication over network communication medium 130 with device B 120. In one embodiment, network communication medium 130 is a wireless network connection between device A and device B using a reservation based protocol. In one embodiment, device A acquires a reservation to transmit data to device B, and both device A and device B share the reservation using a token passing data transfer mechanism for the reservation based protocol. In one embodiment, the reservation based protocol used by the devices for wireless communication is a Bluetooth Private Reservation Protocol implemented as WiMedia MAC (WiMedia technology is a published radio standard for high-speed ultra-wideband (UWB) wireless connectivity, see *Standard ECMA-368 High Rate Ultra Wideband PHY and MAC Standard, 2$^{nd}$* Edition/December 2007, published by ECMA, Rue de Rhône 114, CH-1204 Geneva, Switzerland, available at http://www.ecma-international.org/publications/standards/Ecma-368.htm, and which is also published as an ISO standard, Information technology—Telecommunications and information exchange between systems—High Rate Ultra Wideband PHY and MAC Standard—ISO/IEC 26907, available at http://www.iso.org/iso/iso_catalogue/catalogue_tc/catalogue_detail.htm?csnumber=43900).

Figure 2:
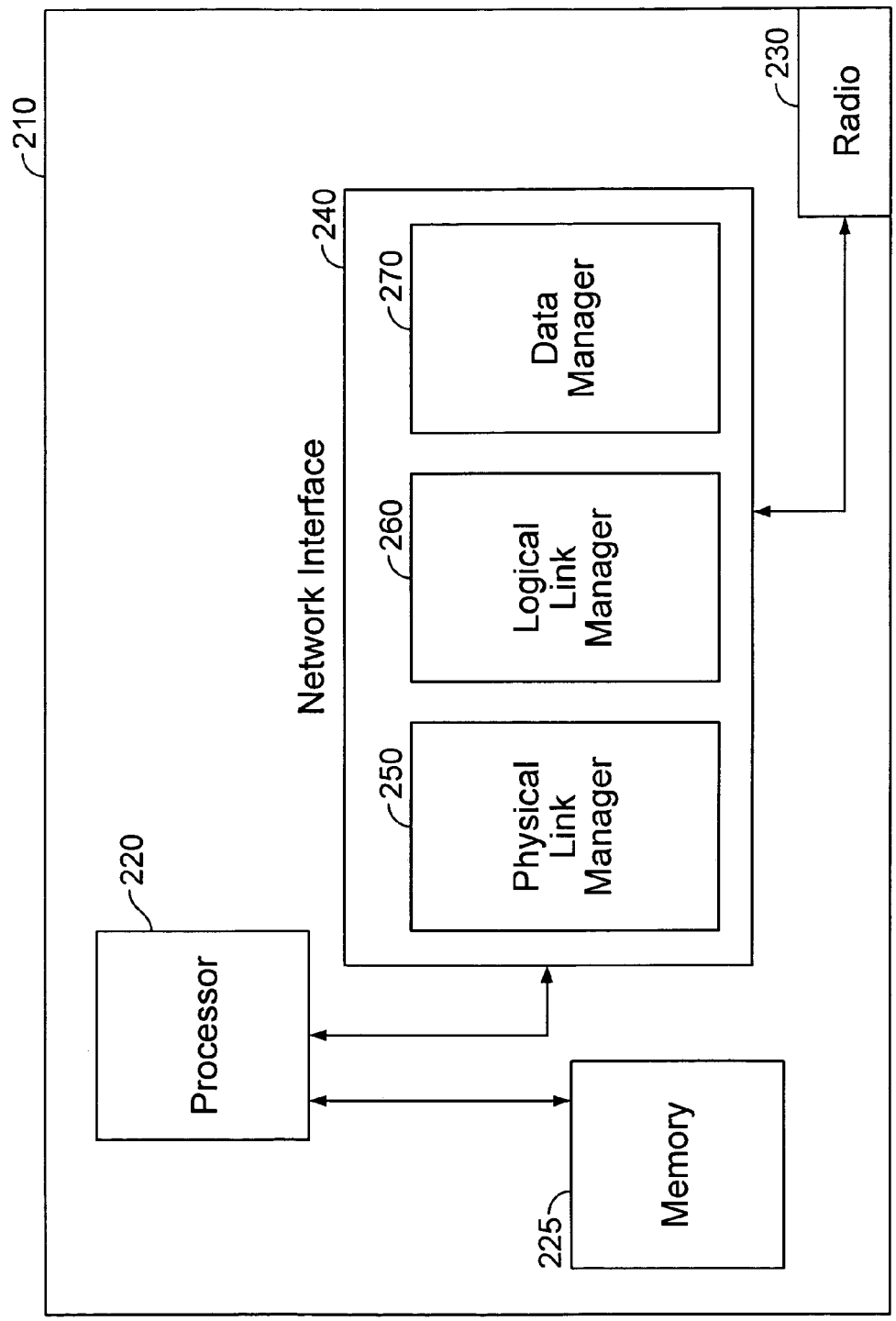
FIG. 2 is a block diagram illustrating an embodiment of a system for a token passing data transfer mechanism for reservation based protocols.

FIG. 2 is a block diagram illustrating an embodiment of a system for a token passing data transfer mechanism for reservation based protocols. In the example shown, device 210 is in network communication, such as via network communication medium 130, with other devices, such as device B 120, using a radio 230 for wireless network communication. Device 210 includes a processor (or controller) 220 for controlling operations of the device and a memory 225 that can be configured with instructions to control operations of the device. In one embodiment, device 210 receives user input from, for example, a keyboard and/or a cursor pointing device (e.g., a mouse, touchpad or other input device). Device 210 includes a network interface 240 for managing network communications including wireless communications via a radio 230. Network interface 240 includes a physical link manager 250 for managing the physical layer of network communications (e.g., for physical link creation and security, such as encryption key generation). Network interface 240 includes a logical link manager 260 for managing the logical layer of network communications (e.g., for managing reservations, such as for reservation establishment and maintenance). Network interface 240 includes a data manager 270 for managing the data communication for network communications (e.g., for transmitting and receiving data, including transmit, receive and buffer management operations such as flush events). In one embodiment, data manager 270 also includes an implementation of a medium access control (MAC) protocol over MAC private distributed reservation protocol (DRP) reservations. In one embodiment, a token passing data transfer mechanism for reservation based protocols is implemented using private DRP reservations (e.g., Bluetooth Private Reservation Protocol).

One or more of the components and/or interactions between components may be optional and additional components not shown in the Figure may be included. For example, those of ordinary skill in the art will recognize that device 210 may be any device capable of communicating with a network communication medium 130 (e.g., using a wireless communication protocol) and implementing a token passing data transfer mechanism for reservation based protocols.

Figure 3:
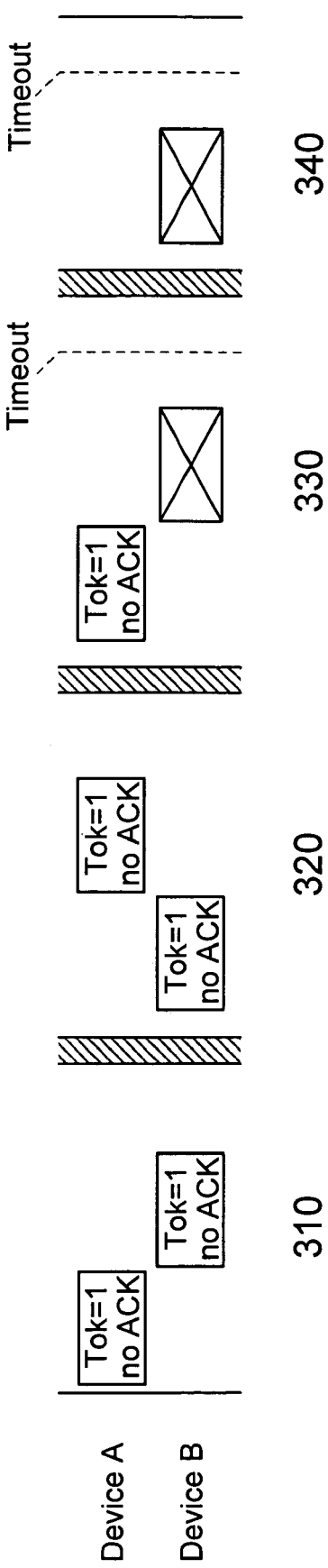
FIG. 3 is a protocol diagram illustrating an embodiment of a process for a token passing data transfer mechanism for reservation based protocols illustrating a timeout.

FIG. 3 is a protocol diagram illustrating an embodiment of a process for a token passing data transfer mechanism for reservation based protocols illustrating a timeout. FIG. 3 illustrates an embodiment of a token exchange with no data traffic in a superframe with four reservation blocks using a default, alternating allocation of zones (e.g., the token holder automatically alternates with each zone). At reservation block 310, device A (e.g., device 110) has the token at the start of the reservation block. Device A has no data to transmit, and thus, device A transmits the token (e.g., using a token frame indicating token=1, no Ack) to device B (e.g., device 120). For example, a device may transmit the token (e.g., using a Transmission Complete (TC) frame using WiMedia standard mechanisms) when it no longer has data to send in the current reservation block and wishes to pass transmission access to the other device. This may also occur when the block-Ack protocol has determined that the other device has no receive buffer space and may be desirable when there are bursts of data transmission and large reservation blocks. This approach also allows for improved power savings by allowing both devices to stop receiving when there is no more activity in a reservation block.

Referring again to FIG. 3, Device B also has no data to transmit, and thus, device A transmits the token back to device A (e.g., using a Transmission Complete Response (TCR) frame using WiMedia standard mechanisms). At this point the reservation block is inactive and both devices can (optionally) disable their receivers (e.g., power down their radios). At reservation block 320, device B has the token at the start of the reservation block. Device B has no data to transmit, and thus, device B transmits the token to device A. Device A also has no data to transmit, and thus, device A transmits the token back to device B. At reservation block 330, device A transmits the token to device B. Device A does not receive any token or data frames from device B prior to an elapse of a timeout period (e.g., protocol defined period of time); device A can then disable its receiver. At reservation block 340, device B has the token at the start of the reservation block. Device B is expected to transmit to device A. Device A does not receive any token or data frames from device B prior to an elapse of the timeout period. Thus, after a timeout, device A can disable its receiver.

Figure 4:
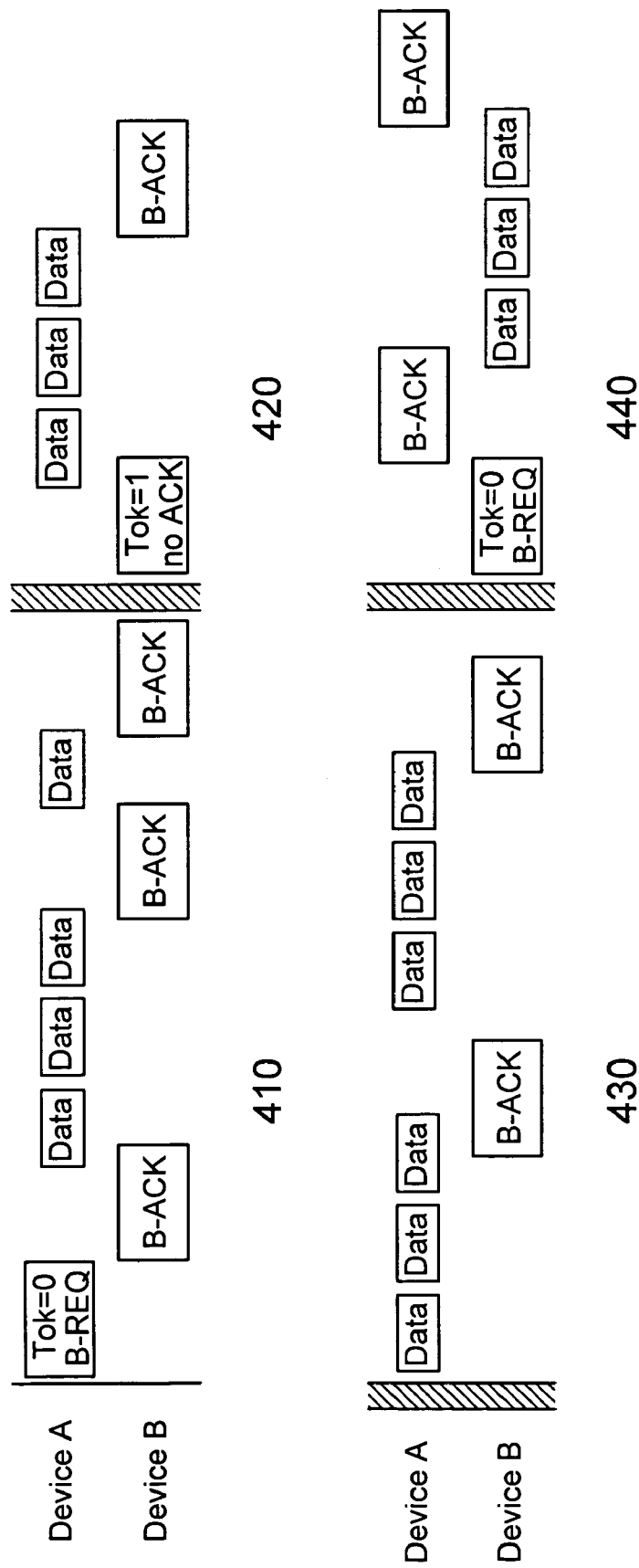
FIG. 4 is a protocol diagram illustrating an embodiment of a process for a token passing data transfer mechanism for reservation based protocols illustrating block-Ack data transfers.

FIG. 4 is a protocol diagram illustrating an embodiment of a process for a token passing data transfer mechanism for reservation based protocols illustrating block-Ack data transfers. FIG. 4 illustrates an embodiment of a token exchange with data traffic in a superframe with four reservation blocks using a default, alternating allocation of zones. In this example, neither device has initiated a block-Ack transfer yet. For example, a WiMedia block-Ack transfer allows a device to transmit multiple data frames before the other device transmits an Ack response frame, which allows for faster data transfer for large data transfers. For example, using WiMedia standard mechanisms, a device can initiate a block-Ack request (e.g., in a first data frame or a token frame) to obtain initial information from the other device to determine how many data frames the other device can receive in a block-Ack data transfer.

Referring again to FIG. 4, at reservation block 410, device A transmits the token (token=0 with B-Ack request set) to initiate a block-Ack transfer of data from device A to device B. In response, device B transmits a B-Ack response to device A. Device A transmits two block-Ack transfers of data before the end of the reservation block. At reservation block 420, device B has the token but has no data to transmit, and thus, device B transmits the token back to device A. Device A then performs another block-Ack transfer during this reservation block. At reservation block 430, device A has the token and transmits two block-Ack data transfers during this reservation block. At reservation block 440, device B has the token and has data to transmit to device A. Device B then initiates a block-Ack transfer and transmits data to device A using a block-Ack data transfer during this reservation block.

Figure 5:
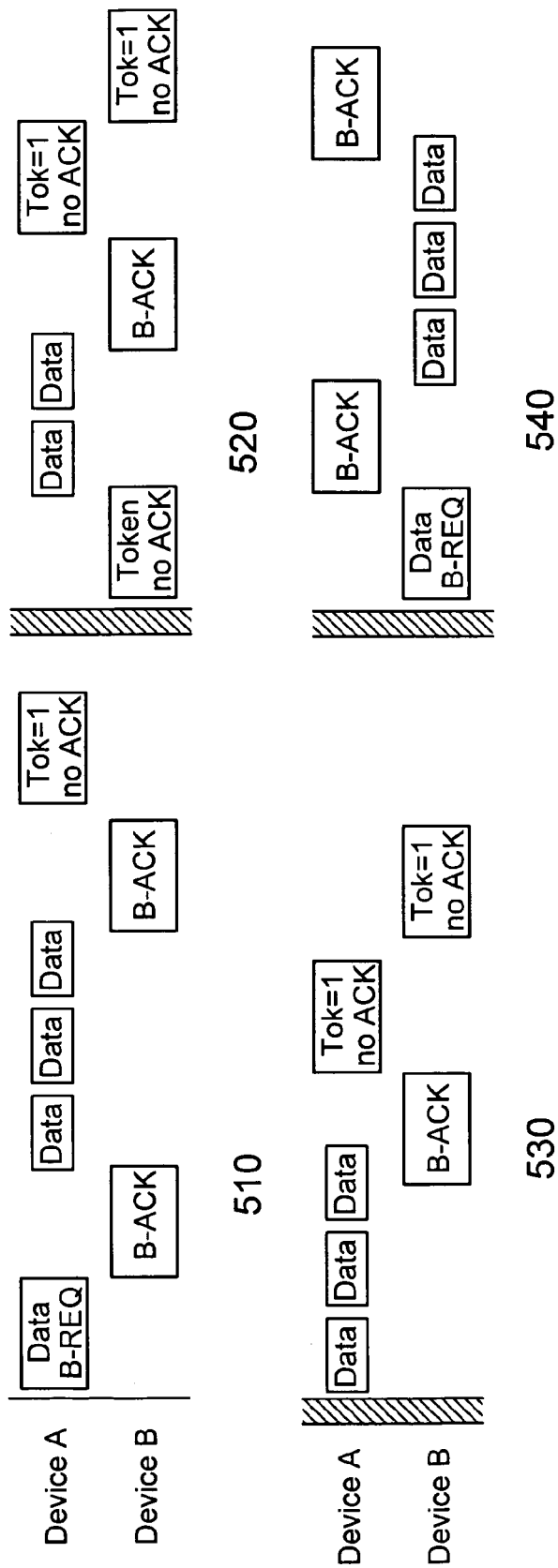
FIG. 5 is a protocol diagram illustrating another embodiment of a process for a token passing data transfer mechanism for reservation based protocols illustrating block-Ack data transfers.

FIG. 5 is a protocol diagram illustrating another embodiment of a process for a token passing data transfer mechanism for reservation based protocols illustrating block-Ack data transfers. In this example, block-Ack data transfers are initiated with a data frame instead of a token frame. FIG. 5 illustrates a data frame initiated block-Ack transfers in a superframe with four reservation blocks using a default, alternating allocation of zones. At reservation block 510, device A transmits a data frame with B-Ack request set to initiate a block-Ack transfer of data from device A to device B. In response, device B transmits a B-Ack response to device A. Device A transmits a block-Ack transfer of data. Device A then transmits the token back to device A using a token frame (Token=1, no Ack). At reservation block 520, device B has the token at the start of the frame. Device B transmits the token back to device A using a token frame (Token=1, no Ack). Device A then initiates a block-Ack data transfer with device B, as device A has already initiated block-Ack data transfers with device B during this superframe (e.g., device A already has been informed by device B of that device's maximum number of data frames it can receive for block-ACK data transfers). Device A then passes the token back to Device B. Device B has no data to transmit, and thus, device B transmits the token back to device A. At reservation block 530, device A has the token at the start of the reservation block. Device A initiates a block-Ack data transfer with device B. Device A then passes the token back to Device B. Device B has no data to transmit, and thus, device B transmits the token back to device A. At reservation block 540, device B has the token at the start of the reservation block. Device B initiates a block-Ack data transfer with device A and then transmits data to device A using a block-Ack data transfer.

Figure 6:
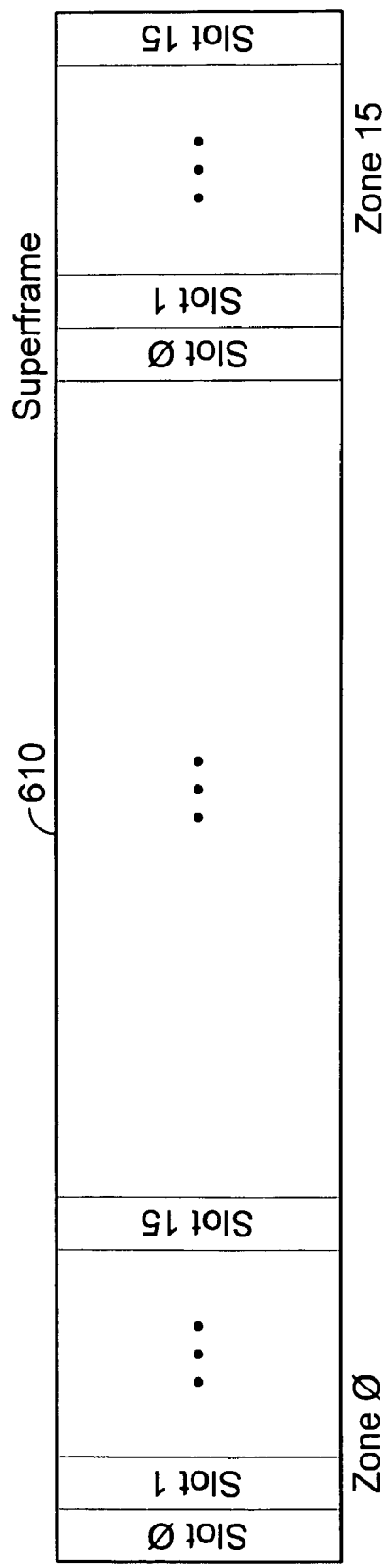
FIG. 6 is a block diagram of an embodiment of a superframe for reservation based protocols.

FIG. 6 is a block diagram of an embodiment of a superframe for reservation based protocols. In this example, a superframe includes 16 zones. Each zone includes 16 equal time slots (e.g., Medium Access Slots (MAS)), thereby providing for 256 time slots in the superframe.

Figure 7:
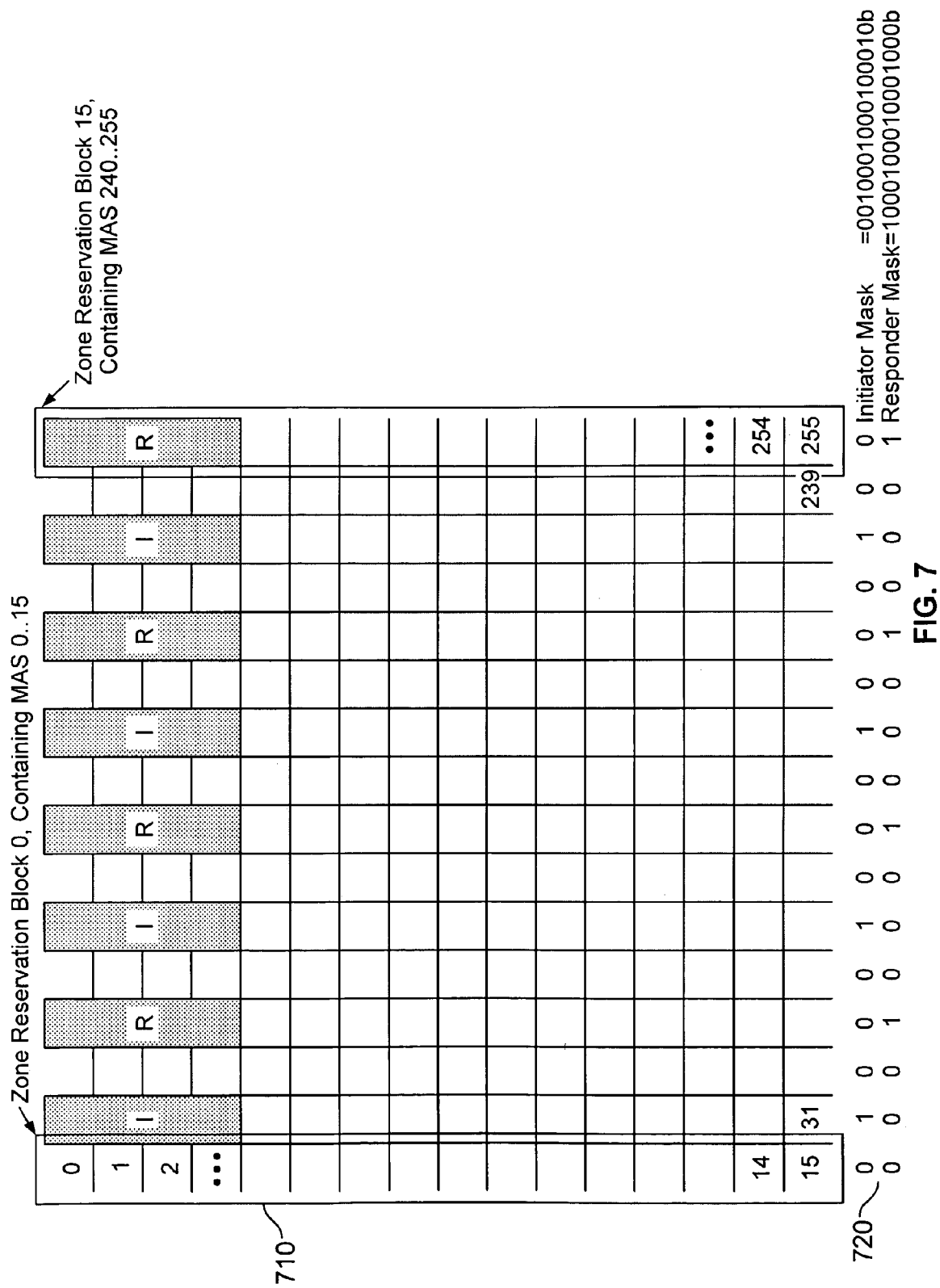
FIG. 7 is a matrix diagram of a superframe illustrating an embodiment of a zone activity frame for a token passing data transfer mechanism for reservation based protocols.

FIG. 7 is a matrix diagram of a superframe, illustrating an embodiment of a zone activity frame for a token passing data transfer mechanism for reservation based protocols. In one embodiment, a device may transmit a zone activity frame to change the default transmission access rules (e.g., alternating by zone) for a superframe. FIG. 7 illustrates an embodiment of a matrix diagram 710 for determining a zone activity frame, in which the MAS of a superframe are laid out in a 16×16 square. The reservation is shown as shaded MAS labeled with I or R to show whether initiator (I) or responder (R) has initial transmission access in that zone. As shown in FIG. 7, a zone reservation block 0 contains MAS 0 . . . 15, and a zone reservation block 15 contains MAS 240 . . . 255. The corresponding initiator (I) bit mask and responder (R) bit mask for the illustrated allocation of zones of the example superframe are shown at 720. The default zone activity bitmap is set according to the default transmission access rules for a superframe (e.g., alternating by zone, in which the device that holds the reservation (e.g., the initiator) is allocated the first zone, and the other device (e.g., the responder) is allocated the subsequent zone, and so forth). A device can change the default zone activity bitmap by transmitting a zone activity frame with its desired zone activity for the superframe. In one embodiment, the zone activity frame is transmitted at the start of the superframe or by a device whenever that device has transmission access, the other device responds by transmitting a zone activity response frame, and a new zone activity for the superframe is determined based on the zone activity frame and the zone activity response frame, in which any requests creating transmission access contention are resolved based on the default allocations.

For example, in a Best Effort reservation using all sixteen zones (e.g., in a Best Effort reservation the transmission access by default automatically alternates between the two devices for every zone containing reserved slots in a superframe, in which the reservation owner shall begin with transmission access for the first zone in the superframe), the devices start each superframe with default zone activity bitmaps as follows:

| Reservation owner: | 0101010101010101b |
| Reservation target: | 1010101010101010b |

Note that in these binary numeric constants bit 0 is on the right, this corresponds to the first zone in time order.

As another example, consider a Best Effort reservation using eight zones with zone reservation blocks in zones 1, 3, 5, 9, 11, 13, and 15. The devices start each superframe with default zone activity bitmaps as follows:

| Reservation owner: | 0010001000100010b |
| Reservation target: | 1000100010001000b |

The example shown in FIG. 7 is illustrated using a 16×16 matrix. The reservation is shown as shaded Medium Access Slots (MAS) (e.g., the UWB MAC allocates medium access time based on MAS, each 256 μs in duration, and there are 16 MAS in a MAC zone, and 16 MAC zones in a MAC superframe, in which a reservation allocates a subset of the 256 MAS in a superframe) labeled with I or R to show whether initiator (I) or responder (r) has initial transmission access in that zone. In one embodiment, device may relinquish its default transmission access in a zone by setting the bit for that zone to zero. A device requests transmission access in a zone by setting the bit for that zone to one. A device gains access to the zone of the other device only if the other device relinquishes it (e.g., default allocation for resolving transmission access contention). In one embodiment, the bits in the zone activity bit mask are not set for zones which are not used in the reservation, and thus, bits for zones which are not used are set to zero or disregarded. In one embodiment, changes in zone activity are only valid for subsequent zones in the superframe, and bits for the current and previous zones may be set to one but shall be disregarded. In one embodiment, changes in the zone activity are persistent thereby modifying the default zone activity for all subsequent superframes or until a new zone activity is set based on another exchange of zone activity and zone activity response frames.

In one embodiment, if a device transmits a zone activity frame, then the other device responds by submitting a zone activity response frame prior to a timeout period has elapsed. In one embodiment, a zone activity frame shall be retransmitted once if the zone activity response frame is not timely received and shall be retransmitted within a specified time period after the expected zone activity frame response. In one embodiment, if a zone activity response frame is not timely received, then the initiating device operates as if the responding device zone activity bitmap requested all zones of the superframe, that is, the initiating device assumes the responding device relinquished no zones and requested all relinquished zones. In one embodiment, a device may only initiate a zone activity frame and zone activity response frame exchange if there is sufficient time remaining in the current zone reservation block for the frame exchange to complete with a potential retransmission and response. In one embodiment, a zone activity and zone activity response frame exchange may occur more than once within a superframe. If multiple zone activity and zone activity response frame exchanges occur, then the zone activity bitmap from the most recent zone activity and zone activity response frame exchange is used.

Figure 8:
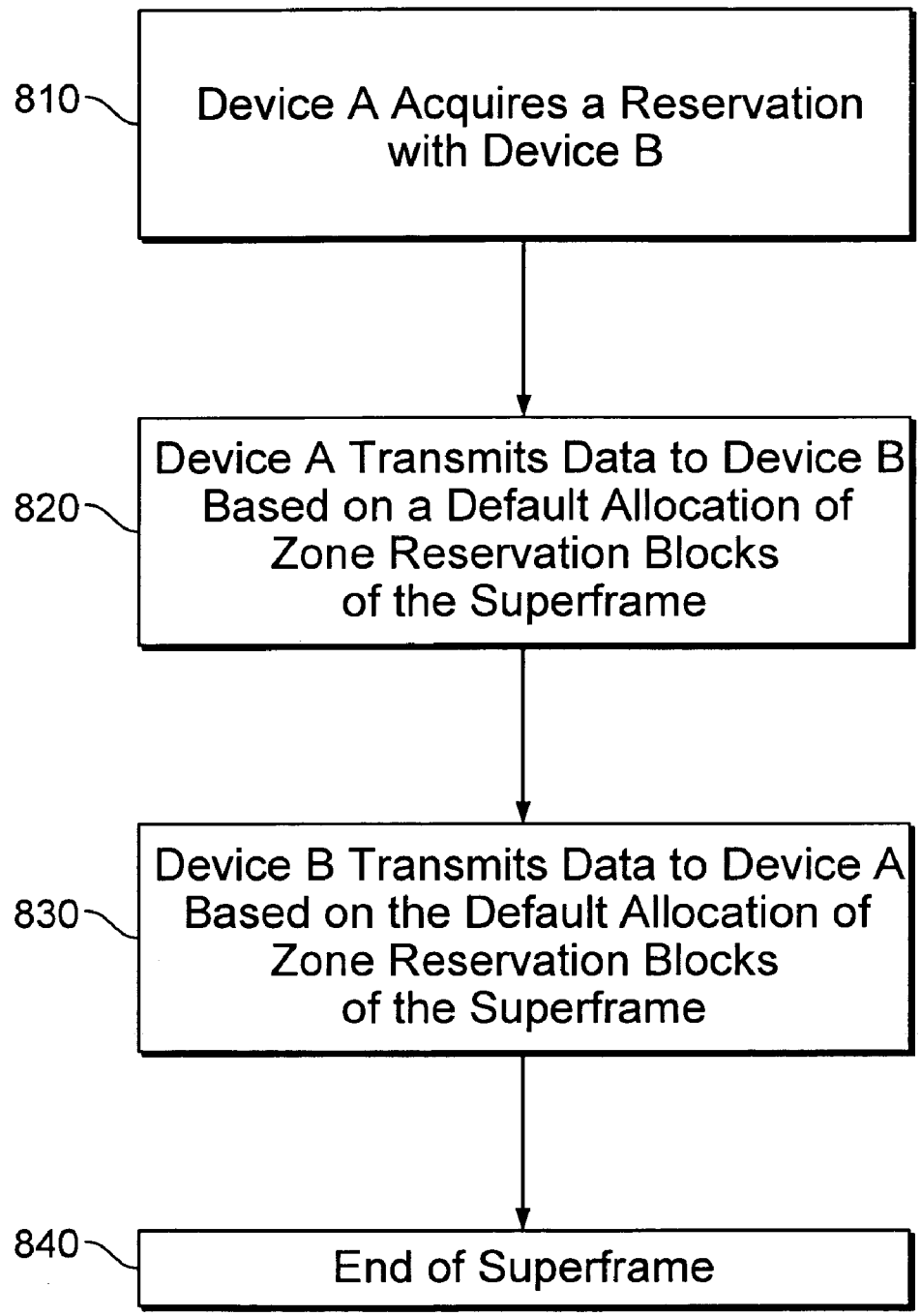
FIG. 8 is a flowchart illustrating an embodiment of a process for a token passing data transfer mechanism for reservation based protocols based on a default allocation of zone reservation blocks.

FIG. 8 is a flowchart illustrating an embodiment of a process for a token passing data transfer mechanism for reservation based protocols based on a default allocation of zone reservation blocks. At 810, device A acquires a reservation with device B for a superframe. At 820, device A transmits data to device B based on a default allocation of the zone reservation blocks of the superframe (e.g., alternating allocation of zones, that is, zones of the superframe containing reserved MAS, starting with device A allocated the first such zone of the superframe). At 830, device B transmits data to device A based on the default allocation of the zone reservation blocks of the superframe. At 840, the reservation is expired at the end of the superframe.

Figure 9:
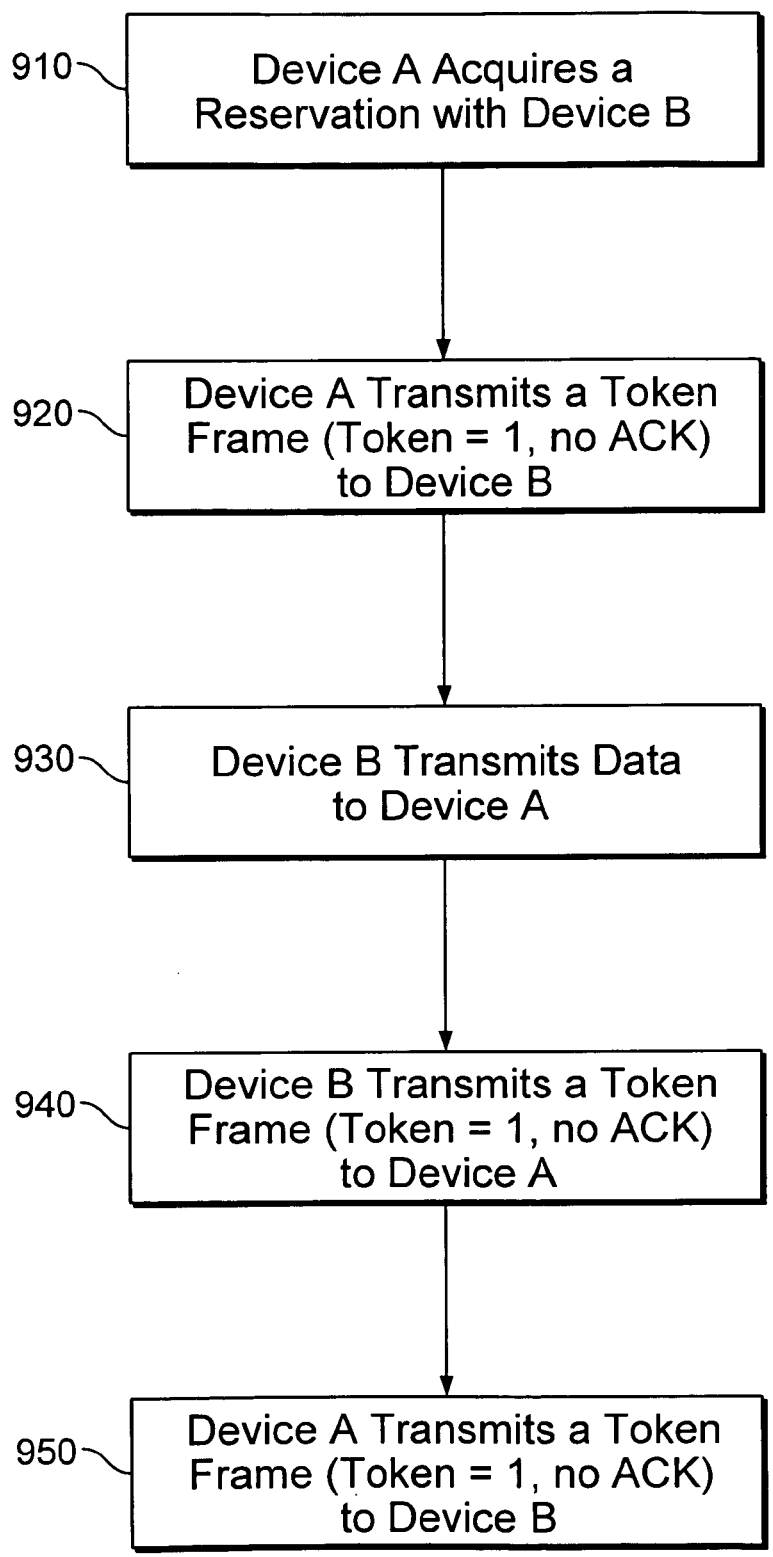
FIG. 9 is a flowchart illustrating an embodiment of a process for a token passing data transfer mechanism for reservation based protocols using a token frame.

FIG. 9 is a flowchart illustrating an embodiment of a process for a token passing data transfer mechanism for reservation based protocols using a token frame. At 910, device A acquires a reservation with device B for a superframe. At 920, device A transmits a token frame (e.g., token=1, no Ack) to device B. At 930, device B transmits data to device A. At 940, device B transmits a token frame (e.g., token=1, no Ack) to device A. At 950, device A transmits a token frame (e.g., token=1, no Ack) to device B.

Figure 10:
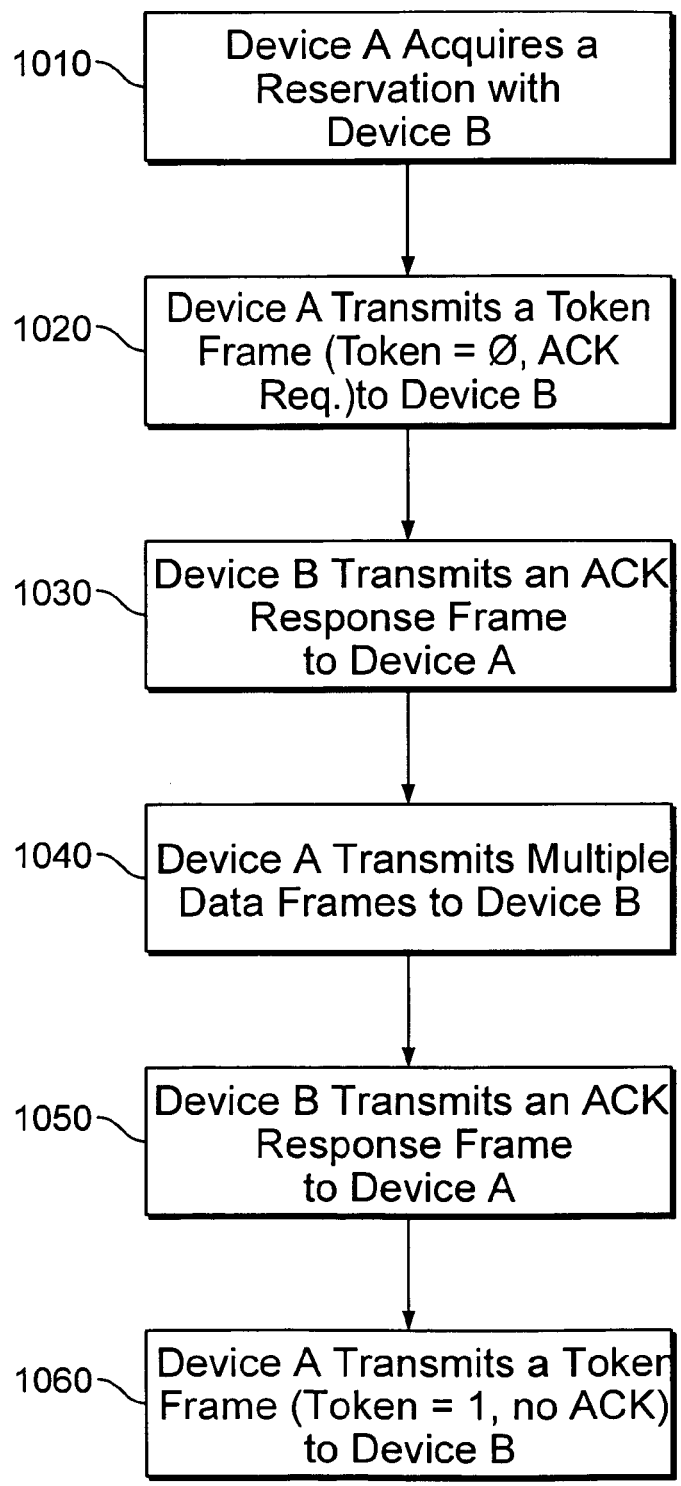
FIG. 10 is a flowchart illustrating an embodiment of a process for a token passing data transfer mechanism for reservation based protocols for block-Ack data transfers.

FIG. 10 is a flowchart illustrating an embodiment of a process for a token passing data transfer mechanism for reservation based protocols allowing for block-Ack data transfers. At 1010, device A acquires a reservation with device B for a superframe. At 1020, device A transmits a token frame (e.g., token=0, Ack request) to device B to initiate a block-Ack data transfer. In one embodiment, an Ack request to initiate a block-Ack data transfer is sent in a data frame to initiate a block-Ack data transfer. At 1030, device B transmits an Ack response frame to device A. At 1040, device A transmits multiple data frames to device B. At 1050, device B transmits an Ack response frame to device A. At 1060, device A transmits a token frame (e.g., token=1, no Ack) to device B.

Figure 11:
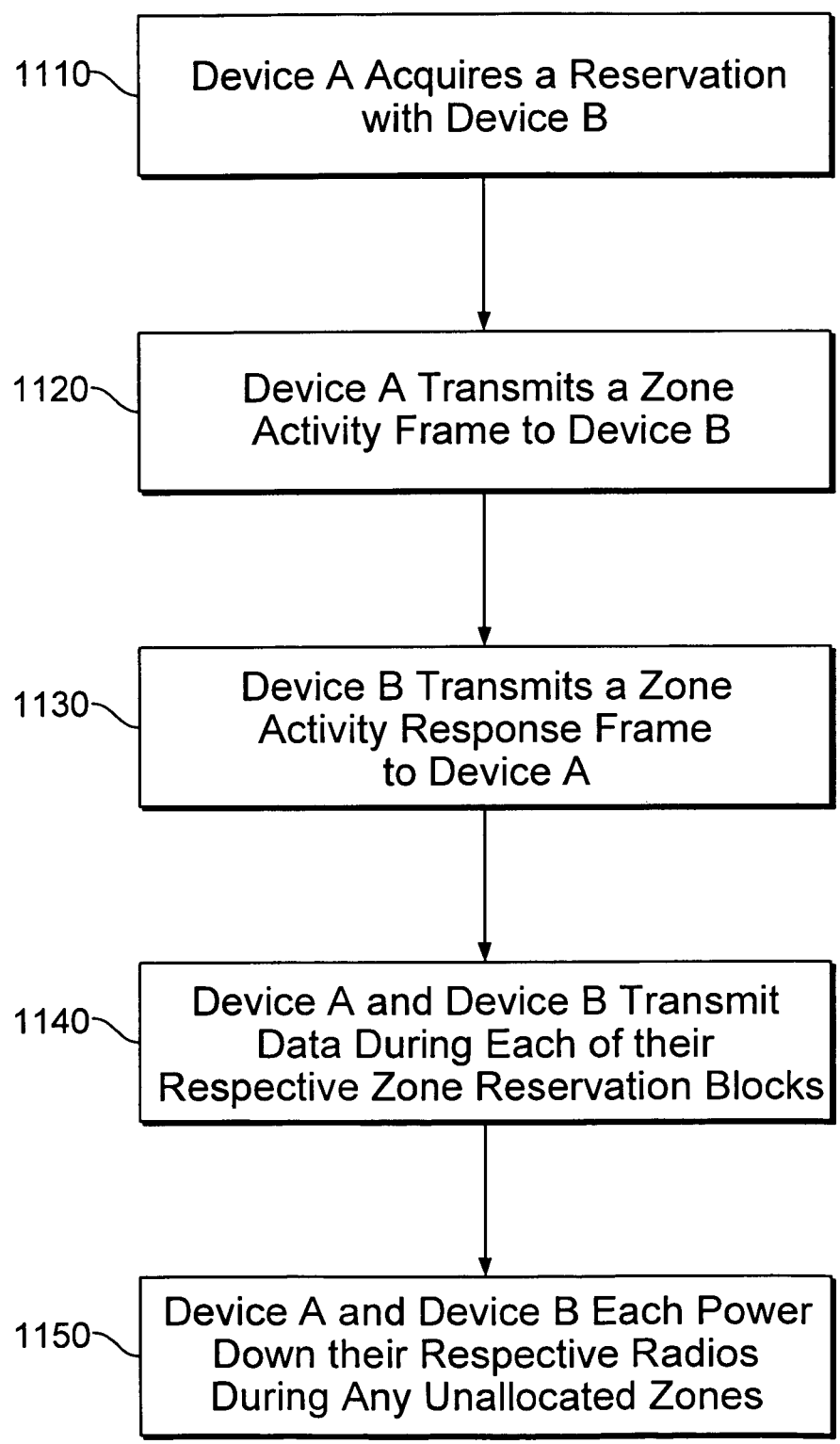
FIG. 11 is a flowchart illustrating an embodiment of a process for a token passing data transfer mechanism for reservation based protocols using a zone activity frame and a zone activity response frame.

FIG. 11 is a flowchart illustrating an embodiment of a process for a token passing data transfer mechanism for reservation based protocols using a zone activity frame and a zone activity response frame. At 1110, device A acquires a reservation with device B for a superframe. At 1120, device A transmits a zone activity frame (e.g., including a zone activity bit mask) to device B. At 1130, device B transmits a zone activity response frame (e.g., including a zone activity bit mask) to device A. At 1140, device A and device B transmit data during each of their respective zone reservation blocks according to a determined zone activity (e.g., based on the exchanged zone activity bitmasks). At 1150, device A and device B each powers down their respective radios during any unallocated zones.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for establishing communication between a first device and a second device participating in a reservation based communication protocol over a wireless communication network, comprising: acquiring a first reservation comprising a plurality of reserved slots within a superframe, wherein at least some of the reserved slots are reservation blocks, and wherein the reservation blocks are contiguous reserved slots; and sharing the first reservation between the first device and the second device using a network interface of the first device and a network interface of the second device comprising: establishing a default allocation of the reservation blocks between the first device and the second device, wherein a portion of the reservation blocks are respectively allocated to each of the devices; and transmitting information from each of the devices during at least a portion of the reservation blocks; and acquiring a second reservation comprising a plurality of reserved slots within a superframe, wherein at least some of the reserved slots are reservation blocks, and wherein the reservation blocks are contiguous reserved slots; and sharing the second reservation between the first device and the second device using the network interface of the first device and the network interface of the second device comprising: transmitting a zone activity frame from the first device to the second device to modify the default allocation of the reservation blocks between the first device and the second device, wherein the zone activity frame comprises a first bit mask indicating which zone reservation blocks the first device requests for transmitting data to the second device during a plurality of zones of the superframe, wherein a zone reservation block comprises a plurality of contiguous reserved slots within a zone, and the second reservation comprises a plurality of zones; and transmitting a zone activity response frame from the second device to the first device, wherein the zone activity response frame comprises a second bit mask indicating which zone reservation blocks the second device requests for transmitting data to the first device during the plurality of zones of the superframe.

2. The method of claim 1 wherein the first device transmits a token frame to the second device to allow the second device to transmit data to the first device during a first reservation block of the first reservation.

3. The method of claim 1 wherein the first device transmits a token frame to the second device to initiate a transfer of data to the second device during a first reservation block of the first reservation, the token frame comprising an acknowledge request, and the first device transmitting a plurality of data frames to the second device during the first reservation block after receiving an acknowledge response frame from the second device.

4. The method of claim 1 further comprising: transmitting a token frame from the first device during a first reservation block of the first reservation indicating that the first device has no further data to transmit to the second device during the first reservation block; and subsequently transmitting data from the second device to the first device during the first reservation block.

5. The method of claim 1 further comprising: transmitting a first token frame from the first device during a first reservation block of the first reservation indicating that the first device has no further data to transmit to the second device during the first reservation block; and subsequently transmitting a second token frame from the first device during the first reservation block indicating that the first device has no further data to transmit to the second device during the first reservation block, wherein the second token frame comprises a retransmission of a transmission control notification of the first token frame.

6. The method of claim 1 wherein the default allocation comprises alternating allocations of a plurality of zones of the superframe, and the owner of the first reservation receives the first zone, wherein the first zone comprises a plurality of reserved slots.

7. The method of claim 1 further comprising: transmitting a reservation block allocation request from the first device to the second device requesting alternate allocations of the reservation blocks of the first reservation.

8. The method of claim 1 further comprising: transmitting reservation block allocation requests from each of the first device and the second device indicating alternate allocations of reservation blocks of the first reservation; and resolving any transmission access contentions based on the default allocation.

9. The method of claim 1 further comprising: transmitting a zone activity frame from the first device to the second device, wherein the zone activity frame indicates which zone reservation blocks the first device requests for transmitting data to the second device during a plurality of zones of the superframe, wherein a zone reservation block comprises a plurality of contiguous reserved slots within a zone, and the first reservation comprises a plurality of zones.

10. The method of claim 1 further comprising: transmitting a zone activity frame in a beacon frame from the first device to the second device, wherein the zone activity frame indicates which zone reservation blocks the first device requests for transmitting data to the second device during a plurality of zones of the superframe, wherein a zone reservation block comprises a plurality of contiguous reserved slots within a zone.

11. The method of claim 1 further comprising:
retransmitting the zone activity frame from the first device to the second device if a zone activity response frame is not received from the second device before an elapse of a timeout period.

12. The method of claim 1 further comprising:
resolving any transmission access contentions based on the default allocation to determine a new zone activity for the superframe, wherein the first device optionally powers down its radio for wireless data transmission during any zones for which no data needs to be transmitted based on the new zone activity for the superframe, and the second device optionally powers down its radio for wireless data transmission during any zones for which no data needs to be transmitted based on the new zone activity for the superframe.

13. The method of claim 1 further comprising: resolving any transmission access contentions based on the default allocation to determine a new zone activity for the superframe, wherein the new zone activity is persistent for subsequent superframes.

14. The method of claim 1 wherein a token frame is transmitted from the first device to the second device to indicate that the first device has no further data to send during a first reservation block of the first reservation, and wherein the first device powers down its radio for wireless data transmission if the second device responds to the token frame transmitted from the first device indicating that the first device has no further data to send by transmitting a token response frame indicating that the second device has no further data to send during the first reservation block.

15. The method of claim 1 wherein a token frame is transmitted from the first device to the second device to indicate that the first device has no further data to send during a first reservation block of the first reservation, and wherein the first device and the second device timeout their respective data transmission during a remainder of the first reservation block if the second device responds to the token frame sent from the first device indicating that the first device has no further data to send by transmitting a token response frame indicating that the second device has no further data to send during the first reservation block.

16. The method of claim 1 wherein the first reservation and second reservation are each a single WiMedia reservation using a Bluetooth Private Reservation Protocol.

17. A system for establishing communication between a first device and a second device participating in a reservation based communication protocol over a wireless communication network, comprising: a processor of the first device configured to acquire a first reservation comprising a plurality of reserved slots within a superframe, wherein at least some of the reserved slots are reservation blocks, and wherein the reservation blocks are contiguous reserved slots; and to share the first reservation between the first device and the second device by establishing a default allocation of the reservation blocks between the first device and the second device wherein a portion of the reservation blocks are respectively allocated to each of the devices; and for allowing for the transmission of information from each of the devices during at least a portion of the reservation blocks; and the processor of the first device further configured to acquire a second reservation comprising a plurality of reserved slots within a superframe, wherein at least some of the reserved slots are reservation blocks, and wherein the reservation blocks are contiguous reserved slots; and to share the second reservation between the first device and the second device by transmitting a zone activity frame from the first device to the second device, wherein the zone activity frame comprises a first bit mask indicating which zone reservation blocks the first device requests for transmitting data to the second device during a plurality of zones of the superframe, wherein a zone reservation block comprises a plurality of contiguous reserved slots within a zone, and the second reservation comprises a plurality of zones; and transmitting a zone activity response frame from the second device to the first device, wherein the zone activity response frame comprises a second bit mask indicating which zone reservation blocks the second device requests for transmitting data to the first device during the plurality of zones of the superframe; and a memory coupled to the processor and configured to provide the processor with instructions.

18. A computer program product for establishing communication between a first device and a second device participating in a reservation based communication protocol over a wireless communication network, the computer program product being embodied in a non-transitory computer readable storage medium encoded with instructions executed by a processor for establishing communication between a first and second device and comprising computer instructions for: acquiring a first reservation comprising a plurality of reserved slots within a superframe, wherein at least some of the reserved slots are reservation blocks, and wherein the reservation blocks are contiguous reserved slots; and sharing the first reservation between the first device and the second device comprising: establishing a default allocation of the reservation blocks between the first device and the second device, wherein a portion of the reservation blocks are respectively allocated to each of the devices; and transmitting information from each of the devices during at least a portion of the reservation blocks; and acquiring a second reservation comprising a plurality of reserved slots within a superframe, wherein at least some of the reserved slots are reservation blocks, and wherein the reservation blocks are contiguous reserved slots; and sharing the second reservation between the first device and the second device comprising: transmitting a zone activity frame from the first device to the second device to modify the default allocation of the reservation blocks between the first device and the second device, wherein the zone activity frame comprises a first bit mask indicating which zone reservation blocks the first device requests for transmitting data to the second device during a plurality of zones of the superframe, wherein a zone reservation block comprises a plurality of contiguous reserved slots within a zone, and the second reservation comprises a plurality of zones; and transmitting a zone activity response frame from the second device to the first device, wherein the zone activity response frame comprises a second bit mask indicating which zone reservation blocks the second device requests for transmitting data to the first device during the plurality of zones of the superframe.

19. The system of claim 17, wherein the processor is further configured to: resolve any transmission access contentions based on the default allocation to determine a new zone activity for the superframe, wherein the first device optionally powers down its radio for wireless data transmission during any zones for which no data needs to be transmitted based on the new zone activity for the superframe, and the second device optionally powers down its radio for wireless data transmission during any zones for which no data needs to be transmitted based on the new zone activity for the superframe.

20. The system of claim 17, wherein the processor is further configured to: resolve any transmission access contentions based on the default allocation to determine a new zone activity for the superframe, wherein the new zone activity is persistent for subsequent superframes.

21. The computer program product of claim 18 further comprising computer instructions for: resolving any transmission access contentions based on the default allocation to determine a new zone activity for the superframe, wherein the first device optionally powers down its radio for wireless data transmission during any zones for which no data needs to be transmitted based on the new zone activity for the superframe, and the second device optionally powers down its radio for wireless data transmission during any zones for which no data needs to be transmitted based on the new zone activity for the superframe.

22. The computer program product of claim 18 further comprising computer instructions for: resolving any transmission access contentions based on the default allocation to determine a new zone activity for the superframe, wherein the new zone activity is persistent for subsequent superframes.

* * * * *